G. W. Loomis,
Bed Bottom.
No. 101,029.          Patented Mar. 22, 1870.

Witnesses.
Edwin E. Marvin
Geo. G. Sill

Inventor.
George W. Loomis
By Ellis & Simonds
Attys.

United States Patent Office.

GEORGE W. LOOMIS, OF HARTFORD, CONNECTICUT.

Letters Patent No. 101,029, dated March 22, 1870.

IMPROVED SPRING-BED BOTTOM.

The Schedule referred to in these Letters Patent and making part of the same

To all whom it may concern:

Be it known that I, GEORGE W. LOOMIS, of Hartford, in the county of Hartford, and State of Connecticut, have invented a new and useful Improvement in Spring-Beds; and I declare the following to be a full and exact description thereof, reference being had to the accompanying drawings and to the letters of reference thereon forming a part of this specification.

Like letters indicate like parts in both figures.

Figure 1:
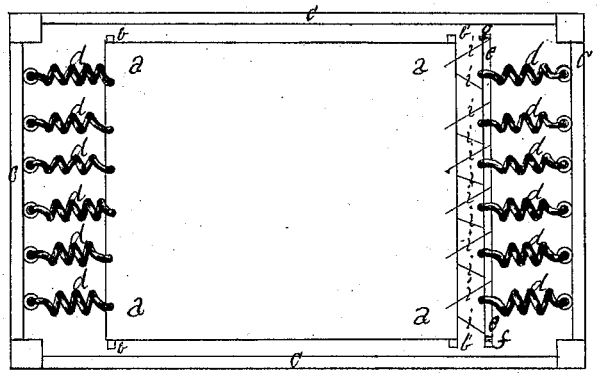
Figure 1 is a plan view.
Figure 2:
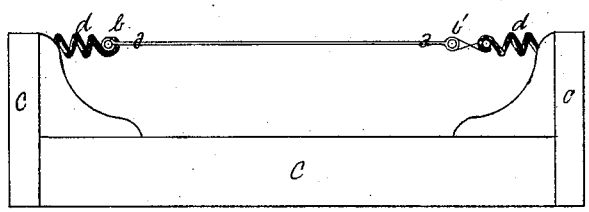
Figure 2 is a side elevation.

The letter $a$ indicates a piece of canvas or stout cloth fastened at both ends to the wooden bars $b\ b'$.

The letter $c$ indicates the frame of the bed, to the head and foot pieces of which are fastened the spiral springs $d$, which on one side are fastened directly to one of the bars $b$, but on the other side are attached to the bar $e$.

A stout cord, $i$, is fastened at one end, $f$, to the movable bar $e$, by means of which cord the movable bar $e$ and the bar $b'$ are triced together, and any desired tension given to the canvas $a$. The cord is fastened at its other end, $g$, to the opposite end of the movable bar $e$.

I claim as my invention—

The combination and arrangement described, of the canvas $a$, bars $b\ b'$, springs $d$, movable bar $e$, and cord $i$, when constructed as described, for the purpose set forth.

GEORGE W. LOOMIS.

Witnesses:
W. E. SIMONDS,
C. LOOMIS.